United States Patent [19]

MacAnally et al.

[11] Patent Number: 4,951,501
[45] Date of Patent: Aug. 28, 1990

[54] TIRE VALVE HAVING DUAL ELECTRIC CONDUCTING PATHS

[75] Inventors: Milton B. MacAnally, Charlotte, N.C.; Carl G. A. Ruf, Dickson, Tenn.

[73] Assignee: Schrader Automotive Inc., Charlotte, N.C.

[21] Appl. No.: 421,959

[22] Filed: Oct. 16, 1989

[51] Int. Cl.⁵ .............................. B60C 23/02
[52] U.S. Cl. .................. 73/146.8; 137/227; 200/61.25
[58] Field of Search ............. 73/146.8, 146.2, 146.3, 73/146.4, 146.5; 137/223, 231, 227; 200/61.25, 61.22; 340/442; 116/34 R, 34 B

[56] References Cited

U.S. PATENT DOCUMENTS

| | | | |
|---|---|---|---|
| 3,537,068 | 10/1970 | Amundsen, Jr. | 200/61.25 |
| 3,906,988 | 9/1975 | Mottram | 73/146.3 |
| 4,117,281 | 9/1978 | Leimbach | 200/61.25 |
| 4,254,312 | 3/1981 | Migrin et al. | 73/146.8 |
| 4,310,014 | 1/1982 | arker | 137/227 |
| 4,310,826 | 1/1982 | D'Angiolillo | 200/61.25 |
| 4,335,283 | 6/1982 | Migrin | 200/61.25 |
| 4,465,013 | 8/1984 | Malec | 116/34 R |

Primary Examiner—Joseph A. Orsino
Assistant Examiner—Brent A. Swarthout
Attorney, Agent, or Firm—Dallett Hoopes

[57] ABSTRACT

This tire valve comprises a brass stem having an elongate insulating sleeve over it, the sleeve being circumposed by a flanged threaded metal body which is provided with a gasket and a clamping nut to clamp the valve to the wheel. Electrically insulated from each other are a pair of contact rings held respectively against the clamping nut on the body and a second final nut contacting the stem, the rings having take-off leads. A molded rubber shroud protects the rings and holds them and an insulating spacer in proper relation.

4 Claims, 1 Drawing Sheet

TIRE VALVE HAVING DUAL ELECTRIC CONDUCTING PATHS

BACKGROUND OF THE INVENTION

1. Field of the Invention

This invention relates to tire valves having a pair of electric conducting paths. It is especially adapted for systems transmitting tire pressure information for on-board-the-vehicle readout. The electric conducting paths are coaxially arranged for ease of manufacturing.

2. Description of Related Art including Information Disclosed under §§1.97 to 1.99

In the prior art there have been showings of the valves having means to send electric sensing information so that pressure within the tire can be communicated to the vehicle. Examples are found in the Migrin U.S. Pat. Nos. 4,254,312, issued March 3, 1981 and 4,335,283 issued June 15, 1982.

SUMMARY OF THE INVENTION

The present invention provides means for conducting electric signals from a sensor within the tire through the tire valve. The valve coaxially conducts both sides of an electric circuit and isolates both sides from the frame of the vehicle.

Briefly the invention comprises a two-piece brass stem adapted to serve as one conductor, an elongate insulating bushing over a central portion of the stem, a flanged threaded brass body surrounding the insulating bushing, a gasket over the body insulating it from the wheel and adapted to seal the rim hole opening. The invention further includes the pick-up means in the form of a pair of rings, one contacting a nut clamping the brass body in the rim hole opening and insulated from the rim, and the other engaging a second nut on the stem.

Because the elements of the valve embodying the invention are coaxial, they may readily be made as screw machine parts, no soldering or welding of wires within the valve being necessary.

BRIEF DESCRIPTION OF DRAWINGS

Other features and objects of the invention will be apparent from the following specification and the drawings, all of which disclose a non-limiting embodiment of the invention. In the drawings.

DESCRIPTION OF THE PREFERRED EMBODIMENT

Figure 2:
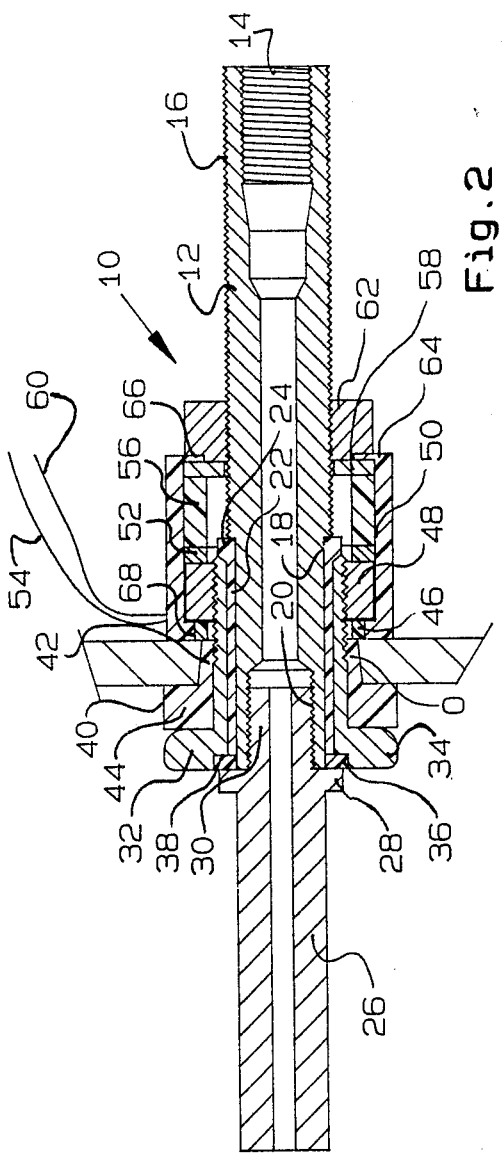
FIG. 2 is a greatly enlarged sectional view along the center line of the valve.

A tire valve embodying the invention is shown in FIG. 2 and generally designated 10. It is installed in the rim hole opening O of a vehicle wheel W shown in fragmentary fashion.

Figure 1:
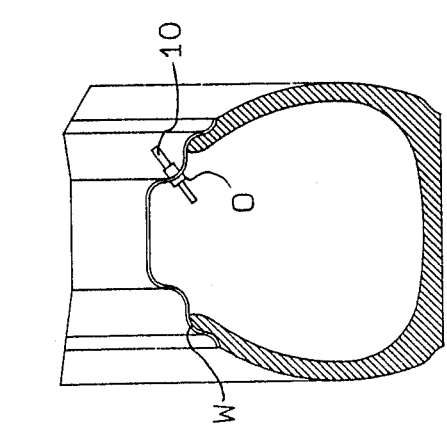
FIG. 1 is a partly schematic sectional view through a tire and wheel in which the valve of the invention has been installed.
Figure 3:
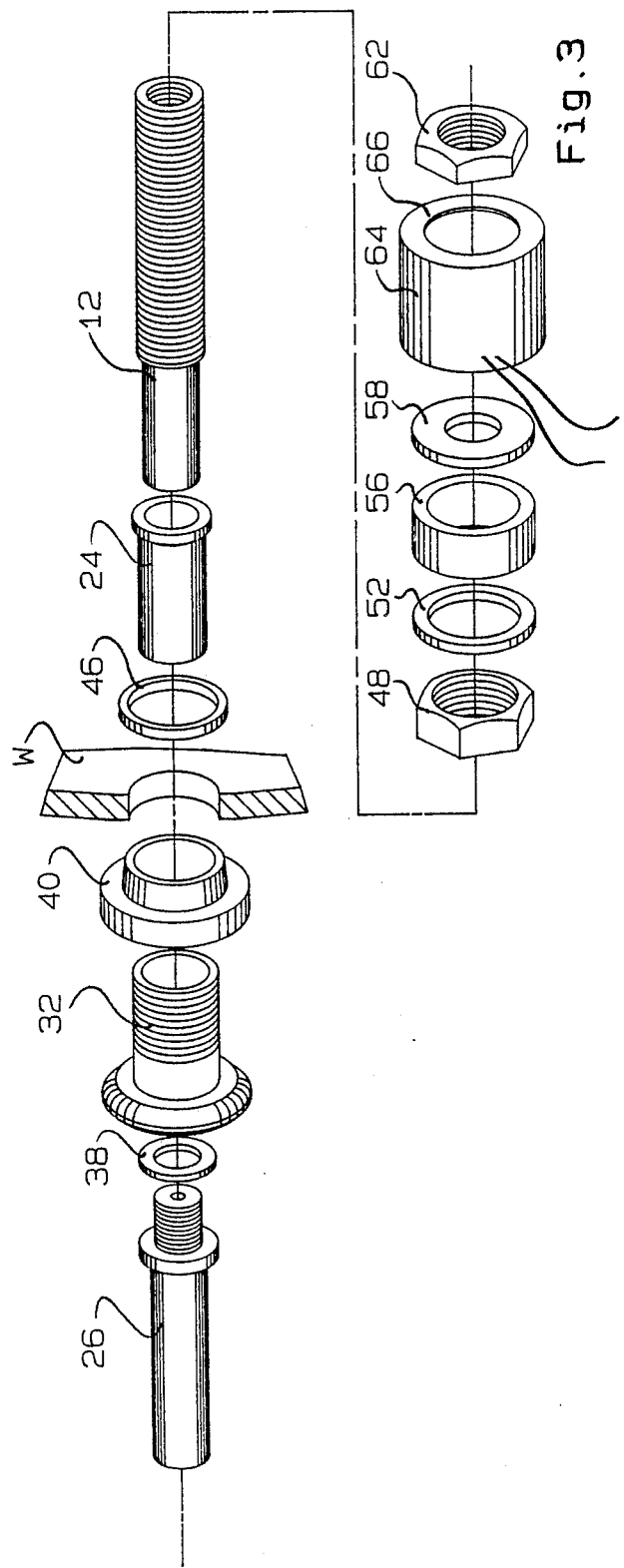
FIG. 3 is an exploded view of the various parts of a valve embodying the invention and showing their relationship to each other.

It should be clear that "outer" and "inner" herein and in the claims refer to relative positions with respect to the center of the adjacent radial cross section of the tire/rim as shown in FIG. 1.

The valve comprises a tubular stem 12 internally threaded at 14 to receive a conventional tire valve core (not shown). The stem at the outer end is also formed with exterior threads 16 for receiving a cap or filling chuck. At its inner end the stem is reduced in outer dimension as at 18 and is interiorly threaded as at 20.

An elongate insulating bushing 22 is sealingly disposed over the reduced area 18 of the stem and is formed at its outer end with an outward enlargement 24.

A terminal pin 26, also tubular, is formed at its outer end with a stop flange 28 and a reduced area 30 which is formed with threads as shown.

A tubular brass body 32 sealingly circumposes the elongate insulating bushing 22 and presents at its inward end a terminal flange 34, the inner end of the flange being formed with an annular recess 36.

An insulating washer 38 is disposed against the stop flange 28 and the threads 20 and 30 of the stem and pin are engaged until the inner end of the stem 12 butts against the flange 28 on the pin.

Sealingly engaging about the body and butting against the outer surface of the flange 34 is a rubber grommet 40 which is formed with a tapered sleeve-like section 42 on its outer end and an annular flange 44 on its inner end.

An anti-friction nylon washer 46 is disposed against the rim of the wheel W on the outside, circumposing the aforedescribed assembly. A clamping nut 48 tightly presses the washer 46 to clamp the valve in the wheel. The nut, engaging threads 50 on the outside of the body compressively clamps the rim of the wheel W to immobilize and sealingly force the sleeve portion 42 of the gasket into engagement with the wheel.

The relationship between the successive layers of the stem 12, the elongate insulating bushing 22, the body 32 and the grommet 40 are such that at their interfaces they are sealingly engaged so that when the grommet 40 is seated in the rim hole opening O and the nut 48 tightened, no air can pass out of the tire except through the tubular stem and pin 12 and 26.

Bearing against the clamp nut 48 is a first contact ring 52, which is preferably brass, and electrically contacts the nut 48 and thereby electrically the brass body 32. An electrical lead 54 is soldered to the ring 52. A tubular teflon spacer 56 circumposes the sleeve 12 and engages against the outer face of ring 52. A second contact ring 58 of lesser inside diameter than ring 52 next circumposes the stem 12 and a second lead 60 is soldered to it. A final brass compression nut 62 preferably having a recess thereabout adjacent its periphery to accommodate the flange 66 of the shroud (see below) threadedly engages the threads on the outside of the tubular stem 16 and is tightened down so that it electrically engages the second contact ring 58.

To protect the contact rings and hold them and the spacer 56 in proper relation, a sleeve-like molded rubber shroud 64 is provided which tightly fits over the clamping nut 48, the contact rings 52 and 58 and the spacer 56. The leads 54 and 60 from the rings 52 and 58, respectively, pass through the skin of the shroud 64 and comprise the take-off leads. To hold the parts in position, the shroud may include terminal inward flanges 66 and 68 which cover the outward edges of the contact ring 58 and nut 48 respectively.

The terminal pin 26 forms an appropriate support as well as contact means for the sensing assembly (not shown) which may be secured thereto by epoxy or mechanical connection. The other side of the sensing signal may make contact with the terminal flange 36. As a result of this arrangement, the electric contacts will conduct respectively through the body 32 and the ring 52 to lead 54 on the one end and through pin 26, stem 12 and the second contact ring 58 to lead 60.

The leads 54 and 60 may be employed in only one of a number of different systems by which the signal from the sensor is transmitted and translated into appropriate display on the dashboard of a vehicle. For instance, such a system is disclosed in a copending U.S. patent application assigned to my assignee under the name of Ditmar Bock et al, Serial No. 07/330,386, filed March 29, 1989.

While the invention has been shown in only one embodiment, it is not so limited but may be thought of as defined by the following claim language and reasonable equivalents thereof.

What is claimed is:

1. A tire fill valve/electric dual lead-through having inner and outer ends with respect to an adjacent radial cross section of a tire/wheel on which the valve/lead-through is mounted, the valve/lead-through including parts having inner ends toward the inner end of the valve/lead-through and outer ends toward the outer end of the valve/lead-through , and comprising:
   a. a brass tubular stem exteriorly and internally threaded at its outer end, the internal threads adapted to receive a conventional valve core, its inner end being internally threaded,
   b. an elongate insulating bushing disposed over the inner end of the stem,
   c. a tubular terminal pin having an outward stop shoulder adjacent its outer end and being threaded at its outer end, the threads snugly engaging in the threads in the inner end of the stem,
   d. a rubber washer being disposed against the outer face of the shoulder,
   e. a tubular brass body having threads on its exterior surface and tightly circumposing the elongate insulating bushing and providing a terminal flange on its inner end abutting the washer,
   f. a rubber grommet having a tapered sleeve section tapering toward its outer end and a radial outward flange about its inner end, the flange abutting the flange in the body,
   g. an anti-friction nylon washer surrounding the body toward the outer end of the body from the grommet,
   h. a brass clamping nut engaging the threads on the body and adapted to clamp a tire valve opening in a rim sealingly against the grommet,
   i. a first contact ring on the body against the outer end of the claiming nut,
   j. a tubular plastic spacer on the body against the outer end of the first contact ring,
   k. a second contact ring of lesser inside diameter than the elongate insulating bushing and disposed on the exteriorly threaded portion of the tubular stem, and
   l. a final brass compression nut threadedly engaging the exterior threads on the stem and compressing the contact rings and spacer against the clamping nut and electrically engaging the second contact ring whereby the terminal pin and terminal flange on the body are electrically integral with the rings respectively.

2. A fill valve/electric dual lead-through as claimed in claim 1 wherein the compression nut, the contact rings and the spacer are enclosed in a sleeve-like rubber shroud, and including a pair of lead wires having an end electrically attached to the contact rings respectively, the wires extending through the shroud.

3. A fill valve/electric dual lead-through as claimed in claim 1 wherein the elongate insulating bushing is radially enlarged at its outer end but to no larger in diameter than the outside diameter of the adjacent threaded portion of the body.

4. A fill valve/electric dual lead-through as claimed in claim 2 wherein an inward flange is formed in the inner end of the shroud and the inner end of the shroud is disposed outward of the nylon washer.

* * * * *